United States Patent
Perruzzi et al.

(10) Patent No.: US 6,651,004 B1
(45) Date of Patent: Nov. 18, 2003

(54) GUIDANCE SYSTEM

(75) Inventors: Joseph J. Perruzzi, Tiverton, RI (US); Michael Dipaola, Portsmouth, RI (US); Edward J. Hillard, Middletown, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 400 days.

(21) Appl. No.: 09/246,212

(22) Filed: Jan. 25, 1999

(51) Int. Cl.[7] .................. G06F 17/10; G06G 7/78; G05D 1/00; F41G 7/00; F42B 10/00
(52) U.S. Cl. .................. 701/302; 701/6; 701/10; 701/92; 701/300; 114/21.3; 114/21.2; 114/21.1; 114/23; 244/3.12; 244/3.11; 244/3.15
(58) Field of Search .................. 701/6, 10, 96, 701/300, 302; 114/21.3, 21.2, 21.1, 23; 244/3.12, 3.11, 3.15

(56) References Cited

U.S. PATENT DOCUMENTS

| | | | | |
|---|---|---|---|---|
| 3,319,052 A | * | 5/1967 | Arshal | 235/150.26 |
| 3,866,229 A | * | 2/1975 | Hammack | 343/112 R |
| 4,172,661 A | * | 10/1979 | Marcus et al. | 356/152 |
| 4,949,089 A | * | 8/1990 | Ruszkowski, Jr. | 342/52 |
| 5,170,352 A | * | 12/1992 | McTamaney et al. | 701/26 |
| 5,430,806 A | * | 7/1995 | Nettles | 382/295 |
| 5,435,503 A | * | 7/1995 | Johnson, Jr. et al. | 244/3.15 |
| 5,552,983 A | * | 9/1996 | Thornberg et al. | 701/23 |
| 5,669,579 A | * | 9/1997 | Zacharius | 244/3.15 |
| 5,822,713 A | * | 10/1998 | Profeta | 701/302 |
| 5,886,257 A | * | 3/1999 | Gustafson et al. | 73/178 R |
| 6,006,145 A | * | 12/1999 | Bessacini | 701/1 |

* cited by examiner

Primary Examiner—William A. Cuchlinski, Jr.
Assistant Examiner—Brian J Broadhead
(74) Attorney, Agent, or Firm—James M. Kasischke; Michael P. Stanley; Michael F. Oglo

(57) ABSTRACT

A method and apparatus for directing a pursuing vehicle, such as a torpedo, on an intercept trajectory from a launching vehicle to a target vehicle with evasion capabilities. The guidance system bases a solution on vectors on a first Cartesian coordinate system. Evasive maneuvers for the target vehicle are based upon vectors on a second Cartesian coordinate system. The guidance system converts the evasive maneuver to the first coordinate system and then performs an iterative process using initial guidance parameter values to determine, upon convergence of the solutions, final guidance parameters for the target vehicle.

22 Claims, 6 Drawing Sheets

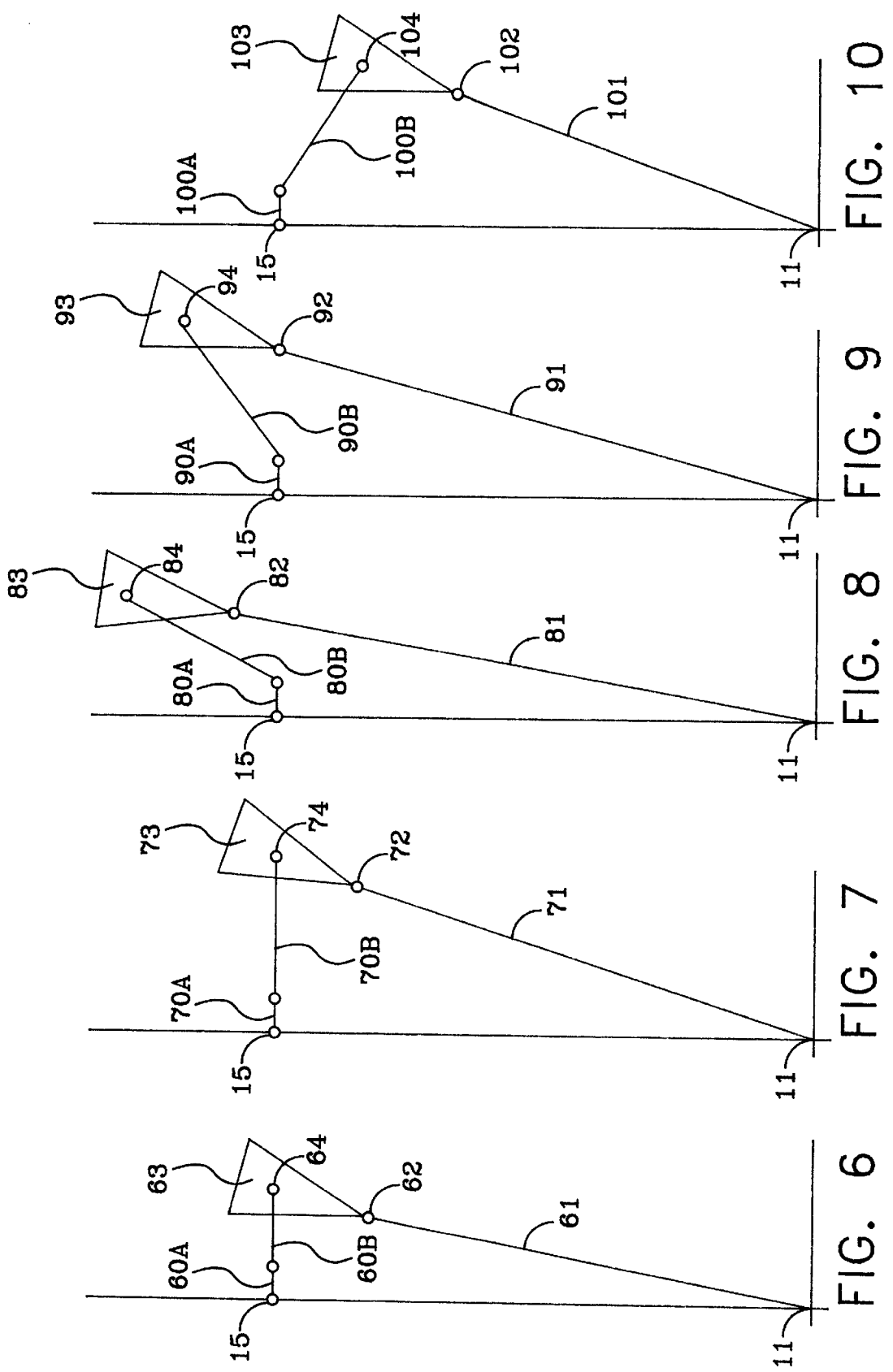

GUIDANCE SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention generally relates to trajectory control and more specifically to a method and apparatus for providing guidance parameters at launch that direct a pursuing vehicle from a launching vehicle to a target vehicle capable of evasive maneuvering after the target vehicle becomes alerted to the presence of the pursuing vehicle.

(2) Description of the Prior Art

The trajectory control of a pursuing vehicle can be classified as post-launch or pre-launch control. In post-launch control, guidance information is sent from the launching vehicle to guide the pursuing vehicle to the target. The following United States Letters Patent disclose such post-launch trajectory control systems:

U.S. Pat. No. 3,260,478 (1966) to Welti
U.S. Pat. No. 3,643,616 (1972) to Jones
U.S. Pat. No. 3,784,800 (1974) to Willoteaux
U.S. Pat. No. 5,319,556 (1994) to Bessacini
U.S. Pat. No. 5,436,832 (1995) to Bessacini et al.

The Welti patent discloses the control of a first object in dependence upon a position of a second object for collision or anti-collision purposes. A regulator, that controls the travel and includes a travel control member for the first object, receives positional information of the first and second objects as a pilot magnitude and a reference magnitude. One of the positional informations is delayed in dependence upon a timing interval proportional to the time change of the quotient of the distance information of the two objects. The regulator subsequently supplies an output magnitude to the travel control member that represents the time differentials between the angular co-ordinates of the first and second objects modified by a disturbance magnitude.

The Jones patent discloses a method and apparatus for guiding a torpedo along a collision course to a moving target ship. A control system on the launching vehicle sends guidance parameters over a communication cable to maintain a predetermined, substantially constant lead angle with respect to the target ship by adjusting torpedo speed as the torpedo travels toward an anticipated collision.

In the Willoteaux patent a trajectory control system calculates the distance between a moving body and other moving or stationary objects by taking account of the speeds and direction of each. The control system simulates a series of hypothetical trajectories diverging on either side of the actual trajectory until a hypothetical trajectory is determined which satisfies various imperatives. The system then instructs the moving body control system to change the linear and or angular speed thereof so that the moving body follows the latter trajectory.

The Bessacini patent discloses an adaptive trajectory apparatus and method for providing, after launch, vehicle control commands to steer an underwater vehicle launch from a vessel toward a contact. As commands produced by this system transfer between the launching vessel and the launched vehicle over a communications link.

The Bessacini et al. patent discloses a beam rider guidance system for directing a steerable object, such as a torpedo. The guidance system senses the bearing between a launching vehicle and a target vehicle and determines the bearing between the launching vehicle and the torpedo as it moves toward the target vehicle. Various error signals are then generated and classified into sensed linguistic variables based on membership functions of different sensed variable membership function sets to become fuzzy inputs to a controller that produces fuzzy control output linguistic variables and associated membership functions from a control output membership function set based upon logical manipulation of the fuzzy inputs. These fuzzy control output membership functions are converted into an output having an appropriate form for control, subject to optional constraint to prevent unwanted effects.

Other references of general interest in the field of trajectory control include:

U.S. Pat. No. 2,879,502 (1959) to Miller
U.S. Pat. No. 3,360,637 (1967) to Smith
U.S. Pat. No. 3,860,791 (1975) to Headle, Jr.
U.S. Pat. No. 4,323,025 (1982) to Fisher et al.
U.S. Pat. No. 5,355,325 (1994) to Uhlmann As generally found in prior art post-launch control systems, a pursuing vehicle exits a launching vehicle. Control systems on the launching vehicle monitor the relative positions of the pursuing vehicle and a target and control the pursuing vehicle by the transfer of information between the launching vehicle and the pursuing vehicle over communications link. When the launching vehicle is a submarine and the pursuing vehicle is a torpedo, the communications link typically comprises a communications wire. If the pursuing vehicle is a missile the communications typically occurs over some radio link. In either case, post-launch control systems on the launching vehicle issue guidance parameters to guide the pursuing vehicle along some trajectory into a predetermined relationship with the target.

In a pre-launch system, the pursuing vehicle follows a predetermined trajectory after launch that may or may not be programmable prior to launch. However, with either type, the pursuing vehicle leaves the launching vehicle and travels along a known trajectory that may be simple or complicated. With torpedoes, missiles and the like, that may undergo pre-programmed maneuvers, the input guidance parameters may include gyro angles and time lapse signals. One time lapse signal represents the interval between the launch and the enablement of any instrumentation on the torpedo or missile such as an acoustic seeker on a torpedo.

In order to provide the most accurate pre-launch guidance parameters to the pursuing vehicle, it is necessary that the interval between the time a last estimate of target state is made and the time a pursuing vehicle is launched be quite short. It is during this interval that a prior art pre-launch system must produce the guidance parameters, and this interval has constrained the nature of the analysis required to produce such guidance parameters. For example, prior art pre-launch systems generally assume that the target will maintain a constant velocity even after the target becomes alerted to the presence of the pursuing vehicle. In actual practice, however, a target normally takes evasive action. With prior art pre-launch systems two or more pursuing vehicles travel along the calculated course and one or more offsets from that calculated course to take evasive maneuvers into account.

SUMMARY OF THE INVENTION

Therefore it is an object of this invention to provide a control method and apparatus for producing guidance parameters for use by a pursuing vehicle at launch that take into account potential evasive maneuvers of a target vehicle.

Another object of this invention is to provide a control method and apparatus for providing guidance parameters to a pursuing vehicle for use at launch that take into account a time at which the target vehicle becomes aware of the pursuing vehicle and the effect of any potential evasive maneuvers thereafter. Yet another object of this invention is to provide a control method and apparatus for providing guidance parameters to a pursuing vehicle for use at launch a short interval after a launching vehicle obtains an estimate of target vehicle state for producing an intercepting trajectory to an alerted target vehicle taking evasive action.

In accordance with this invention guidance parameters are provided to a pursuing vehicle prior to launch to place a pursuing vehicle on an intercept trajectory from a launching vehicle to a target vehicle with evasion capabilities. At the launching vehicle, the control method and apparatus determine the range, bearing, course and speed of the target vehicle and determine the guidance parameters based upon a first Cartesian coordinate system. The method and system receive a definition of target vehicle trajectory including a possible evasive maneuver defined on a second Cartesian coordinate system. This definition is converted from the second to the first Cartesian coordinate system. Iterative processing then uses this information on the first Cartesian coordinate system to plot the trajectories of the pursuing and target vehicles to an intercept in advance of the launch to generate the initial operating parameters for transfer to the pursuing vehicle.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

FIGS. 6 through 10 depict the trajectories of pursuing and target vehicles under different target vehicle trajectories.

DESCRIPTION OF THE PREFERRED EMBODIMENT

This invention generally enables a pre-launch calculation of gyro angles and related initial operating parameters to be transferred to a torpedo or other pursuing vehicle such that the preprogrammed trajectory of the pursuing vehicle after launch takes into account an assumed detection of the target vehicle and some resultant evasive action. As will be shown, this invention is particularly adapted for providing this major enhancement with minimal changes to an existing control system. Consequently it will be helpful first to review the various relevant relationships that exist among launching, pursuing and target vehicles and that prior art control system.

Figure 1:
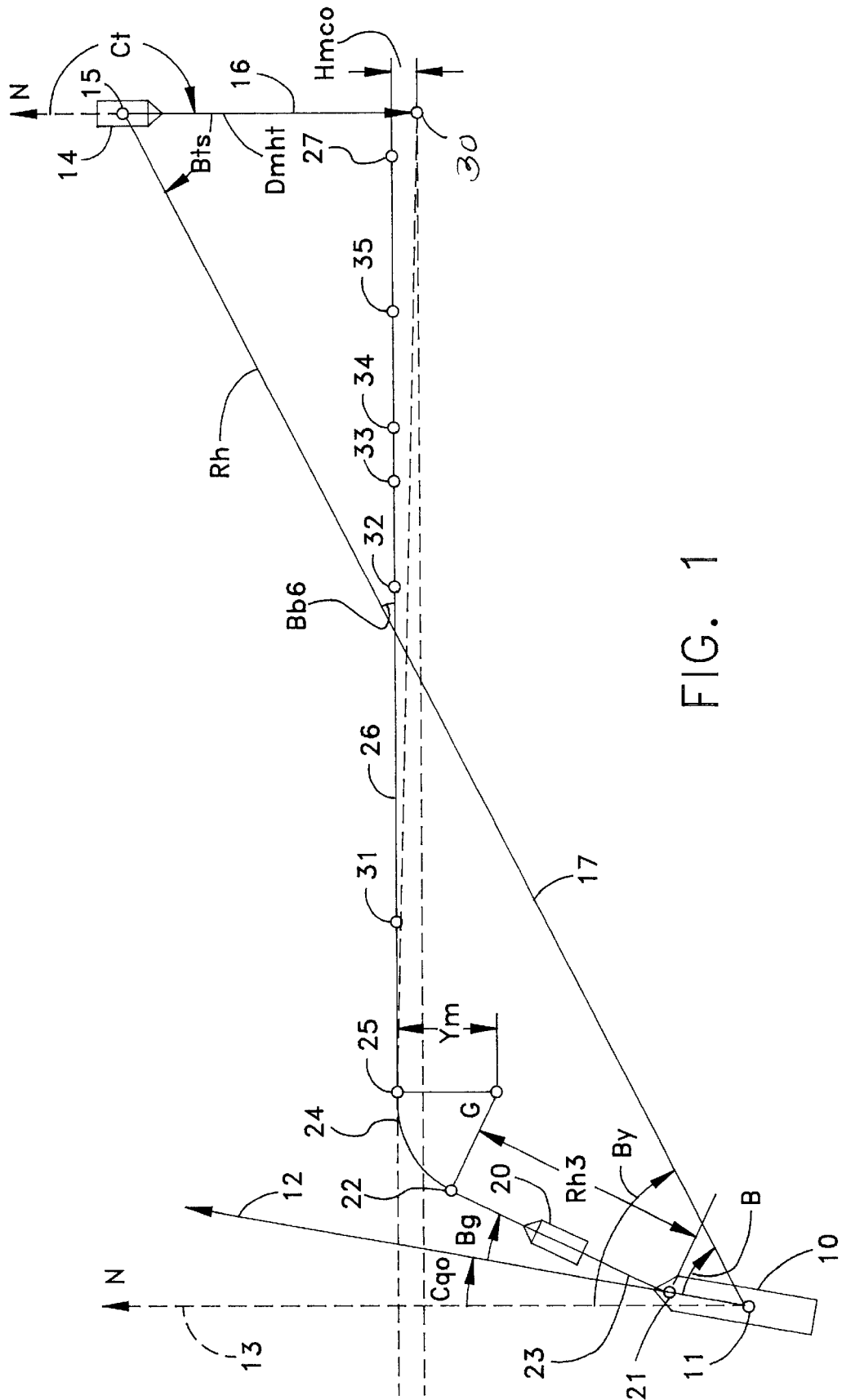
FIG. 1 is a vector diagram establishing certain relationships among launching, pursuing and target vehicles.

FIG. 1 (albeit not to scale) discloses a launching vehicle 10 located at a launch point 11 and traveling along a course represented by a launching vehicle course vector 12. The vector 12 has a bearing Cqo measured with respect to a reference, normally True North shown by a dashed line 13 lying along a North-South axis. A target vehicle 14 is assumed to be detected at a location 15 while traveling along a target vector 16 having a bearing $C_t=180°$ at a velocity Dmht. As shown in FIG. 1 a bearing vector 17 extends at an angle By from the dashed line or a reference vector 13 and at an angle B between the course vector 12 and the bearing vector 17 at the time of launch. As known, sensors and related equipment on the launching vehicle 10 determine the bearing, By, and range, Rh, from the launching point 11 to the target vehicle detection position 15. The target vehicle detection position 15 is considered to the target vehicle position at launch.

A typical pursuing vehicle 20 is a torpedo that is launched from a tube within the launching vehicle 10 by externally applied forces. The orientation and other characteristics of the launching system associated with such a tube determine the position of an actual launch point 21 and the tube offset, Bg, to a location 22 at which a gyro turn begins. A vector 23 represents the course with the offset, Bg, corresponding to the angle between the vector 12 and the vector 23. The distance from position 21 to position 22 is Rh3. In the FIGS. 1 and 2 the pursuing vehicle is shown at a position after launch.

At position 22 the pursuing vehicle 20 begins its gyroscopically controlled turn through an angle G and at a radius Ym. After completing the gyro turn 24 at position 25, the pursuing vehicle 20 travels along a path 26 to an aim point 27. The aim point 27 typically is displaced from the intercept point 30 to compensate for a number of influences, including cross drift. A variable, Hmcor, represents this compensation. The path 26 intersects the bearing vector 17 at an angle Bb6. This is a torpedo lead angle based upon bearings from the launching point 11 to the target detection location 15 and an intercept point 30.

In accordance with standard procedures involving torpedoes, the pursuing vehicle 20 may undergo a number of maneuvers and other functions as it travels along the path 26. These include the completion of an initial climb or dive at position 31, a second dive beginning at position 32 and ending at position 33 and the enablement of any acoustic seeking devices at location 34. A laminar position 35 represents the position at which it is expected that detection or homing devices on the pursuing vehicle 20 will acquire the target vehicle 14.

Figure 2:
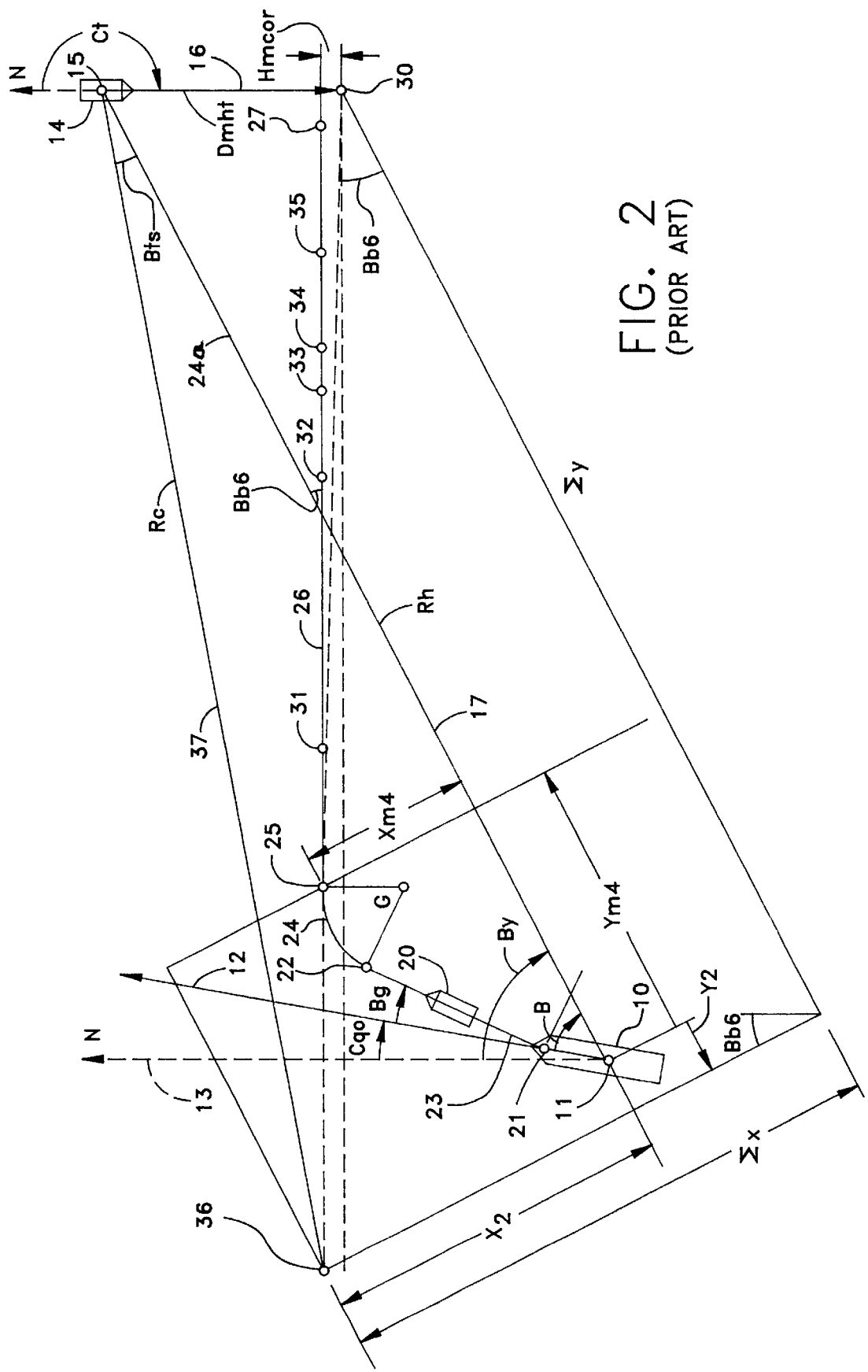
FIG. 2 depicts the relationships of FIG. 1 as implemented in a prior art control system.

FIG. 1 depicts bearings, ranges and courses all on a Cartesian coordinate system having its axes aligned with map headings, i.e., the Y axis lies on a North-South axis. As known, a control system to which this invention is adapted uses a "pseudo launch point" and a corresponding second Cartesian coordinate system in which the ordinate lies along the bearing line 24A as shown in FIG. 2. Consequently the second Cartesian coordinate system is rotated from the first Cartesian coordinate system by the torpedo lead angle Bb6.

In addition to using this second Cartesian coordinate system, this control system defines a pseudo launch point 36 that lies along a backward extension of the path 26 from the position 25 at which the gyro turn completes to the aim point 27. The actual location of the pseudo launch point 36 along this path is obtained by projecting the actual path from the launching vehicle 20 to the end of the gyro turn 25 onto this backward extension. New relationships can be defined with this second Cartesian coordinate system. For example, Y2 and X2 are the "x" and "y" components of the pseudo launch point 36 to the position of the launch point 21. Distances Xm4 and Ym4 correspond to the "x" and "y" components of a vector from the original launch point of the launching vehicle 20 to the location 25 at which the pursuing vehicle completes its gyro turn. Remembering that Rh3 defines the distance between positions 11 and 25:

$$X2 = Xm4 + \left[Rh3 + Hmcor + \left(\frac{\pi}{180}\right)\right] * \sin(Bb6) \quad (1)$$

and $$Y2 = Ym4 + \left[Rh3 + Hmcor + \left(\frac{\pi}{180}\right)\right] * \sin(Bb6) \quad (2)$$

where the end of the gyro turn is:

$$Xm4 = Xm4i + [Ym * \cos(Bb6)] \quad (3)$$

and $$Ym4 = Ym4i + [Ym * \sin(Bb6)] \quad (4)$$

and the center of the gyro turn, defined by Xm4i and Ym4i, is given by:

$$Xm4i = [Rh3 * \cos(Bg) - Ym * \sin(Bg) + Pdog] * \sin(B) - [Rh3 * \cos(Bg) + Ym * \cos(Bg) + Pdng] * \cos(B) \quad (5)$$

and $$Ym4i = [Rh3 * \cos(Bg) - Ym * \sin(Bg) + Pdog] * \cos(B) + [Rh3 * \cos(Bg) + Ym * \cos(Bg) + Pdng] * \sin(B). \quad (6)$$

As previously indicated the constants Rh3, Ym and Hmcor are a function of the pursuing vehicle. Pdog, Pdng and Bg are a function of the launching vehicle where Pdog and Pdng represent the center of the launching vehicle from the actual launching tube.

The gyro angle, G, is found from:

$$G = B - Bg + Bb6. \quad (7)$$

With this information it is possible to establish the distance from the pseudo launch point 36 to the intercept point 30 in terms of "x" and "y" components directed along the second Cartesian coordinate system. This distance is established in terms of both the location 11 and the initial location, course and speed of the target vehicle 14 at location 15. Specifically the distance is defined by ΣX and ΣY as follows:

$$\Sigma X = X2 + (Tr * Dmht * \sin(Bts)) \quad (8)$$

and $$\Sigma Y = Rh - Y2 - (Tr * Dmht * \cos(Bts)) \quad (9)$$

where Tr is the total run time from launch to intercept.

From the foregoing descriptions and from FIG. 2, the aspect angle Bts is:

$$Bts = \pi + By - Ct \quad (10)$$

and Ct is the target course and By is the time bearing reference from North-East given by:

$$By = B + Cqo. \quad (11)$$

and Cqo is the launch vehicle course.

As known, iterative processing techniques are generally used to provide the final guidance parameters such as the gyro turn angle G and the total time, Tr, to reach the intercept point 30. In a typical process initial values of these guidance parameters are given, solutions are generated and errors are produced to establish new values for the initial guidance parameters. Iterative processing continues until the error is reduced to an acceptable level, i.e, the error converges. Then the final guidance parameters are transferred to the pursuing vehicle prior to launch. These solutions essentially involve unknown parameters which are the total run time, Tr, a total run distance, Hm6, and the torpedo lead angle Bb6. The three sets of equations which must be solved are:

$$Tr = -\frac{\left[Hm6 + |sq(Hm)| * \left(\frac{Umn}{Ums} - 1\right) + Hm56 * \left(\frac{Umn}{Umd} - 1\right)\right]}{Umn} + \frac{Hpsm * \left(\frac{Ums}{Spsm} - 1\right)}{Ums} \quad (12)$$

where Sq(Hm) is an enable run offset distance, Umn is the speed of the pursuing vehicle to location 32 and Ums represents the speed of the pursuing vehicle between positions 34 and 35. Umd represents the speed at which the pursuing vehicle performs any diving maneuvers, Hm56 represents the distance for such dives, Hpsm represents the distance during which the pursuing vehicle travels for a passive snake maneuver and Spsm represents the speed for the passive snake maneuver. The next equation is:

$$\Sigma Y * \sin(Bb6) - \Sigma X * \cos(Bb6) + \left[\left(Tr * DCqm * \frac{\sin(LY2)}{2} - DCo * Td\right) * \frac{\pi}{180}\right] * Hm6 = 0 \quad (13)$$

where Dcqm is a drift constant, LY2 is a latitude over which the firing angle may vary, DCo is the turn rate of the launching vehicle 20, and Td is the gyro uncaging time that is the time required to enable the gyro to begin operation. Finally, the last equation is:

$$Hm6 = \Sigma X * \sin Bb6 + \Sigma Y * \cos Bb6 - LD \quad (14)$$

where LD is the torpedo detection range, i.e., the range over which the torpedo can acquire a target with any homing devices. Solving equations (12), (13) and (14) in an iterative algorithm yields the solution to the problem.

In accordance with known procedures, the control system uses the initial guidance commands to begin a plot of the pursuing vehicle trajectory from the time of launch. It simultaneously plots the target vehicle trajectory at its constant course and speed. Typically the total run time to intercept will differ from the initial value. Consequently on a next iteration the control system uses the new values to plot new trajectories. This continues until the differences converge. When this processing completes the pursuing vehicle receives guidance parameters and is launched from the pre-enabled launch point 11. Thereafter the pursuing vehicle moves along the prescribed trajectory to the intercept point 30.

Figure 3:
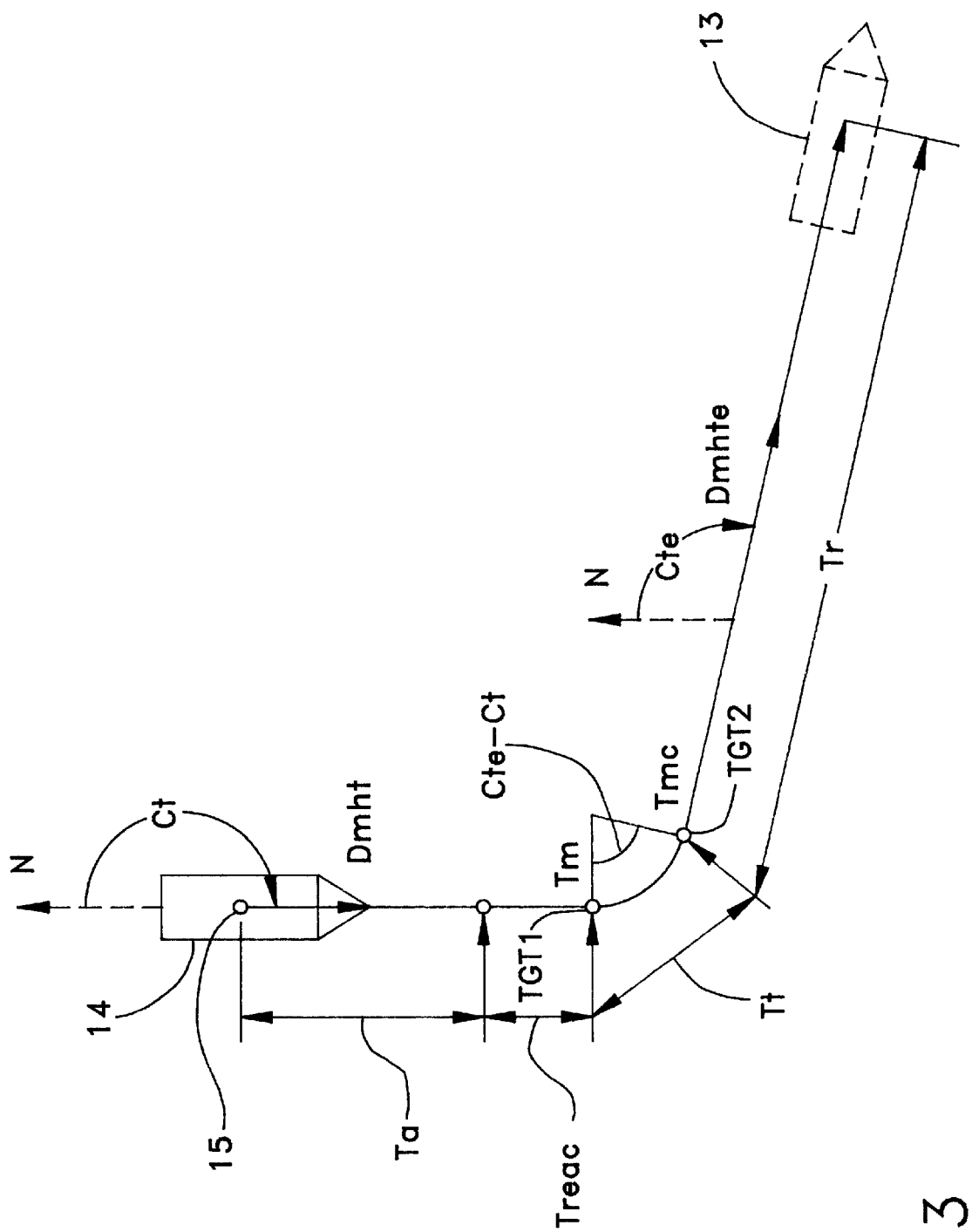
FIG. 3 depicts relationships of a target vehicle evasion.

The prior art control system only operates with an assumed constant course and speed of the target vehicle 14. This invention enables a solution after introducing an evasive maneuver. The maneuver is defined in terms of an alertment time, Ta, that represents the interval between the launch of the pursuing vehicle and time at which it is expected the target vehicle 14 would detect the pursuing vehicle 20. Other terms include a reaction time, Treac, that is the time expected to pass while persons controlling the target vehicle determine and initiate an appropriate evasive maneuver. Another term, Tt, represents the time that the target vehicle 14 will be in a turn. Each time is shown in FIG. 3 according to the first Cartesian coordinate system in which the ordinate lies along the North-South axis. The straight line trajectory of the target vehicle 21 from the time of launch at location 15 to a first location $TGT_1$ at the beginning of a turn in polar coordinates is given by:

$$TGT_1 = Dmht * e^{jCt}(Ta+Treac). \qquad (15)$$

where $e^{jCt}$ is defined as:

$$e^{jCt} = \sin(Ct) + j\cos(Ct) \qquad (16)$$

and where j represents a 90° clockwise rotation. A position $TGT_2$ at the end of the evasive maneuver is given by:

$$TGT_2 = TGT\_RAD * \left[ e^{j(Ct+\frac{\pi}{2})} + e^{j(Cte-\frac{\pi}{2})} \right] \qquad (17)$$

where TGT_RAD is the radius of turn of the target vehicle and Cte is the course of the target vehicle 21 after the evasive maneuver. Thus at any time Tr evasive maneuver at position $TGT_3$ can be given by:

$$TGT_3 = Dmhte * e^{jCte} * (Tr-Ta-Treac-Tt) \qquad (18)$$

where the turning time is given by:

$$Tt = \left| \frac{Cte - Ct}{TGT\_RATE} \right|. \qquad (19)$$

where TGT_RATE is the angular rate of turn of the target vehicle. Thus in the Cartesian coordinate system shown in FIG. 3 the target position is at the intersection or $TGT_x$ and $TGT_y$ coordinates according to:

$$TGT_x = Dmht * (Ta + Treac) * \sin(Ct) + \qquad (20)$$
$$TGT\_RAD * Tt * \left[ \sin\left(Ct+\frac{\pi}{2}\right) - \sin\left(Cte-\frac{\pi}{2}\right) \right] +$$
$$Dmhte * (Tr - Ta - Treac\_Tt) * \sin(Cte)$$

and $$TGT_y = Dmht * (Ta + Treac) * \cos(Ct) + \qquad (21)$$
$$TGT\_RAD * Tt * \left[ \cos\left(Ct+\frac{\pi}{2}\right) - \cos\left(Cte-\frac{\pi}{2}\right) \right] +$$
$$Dmhte * (Tr - Ta - Treac\_Tt) * \cos(Cte)$$

Figure 4:
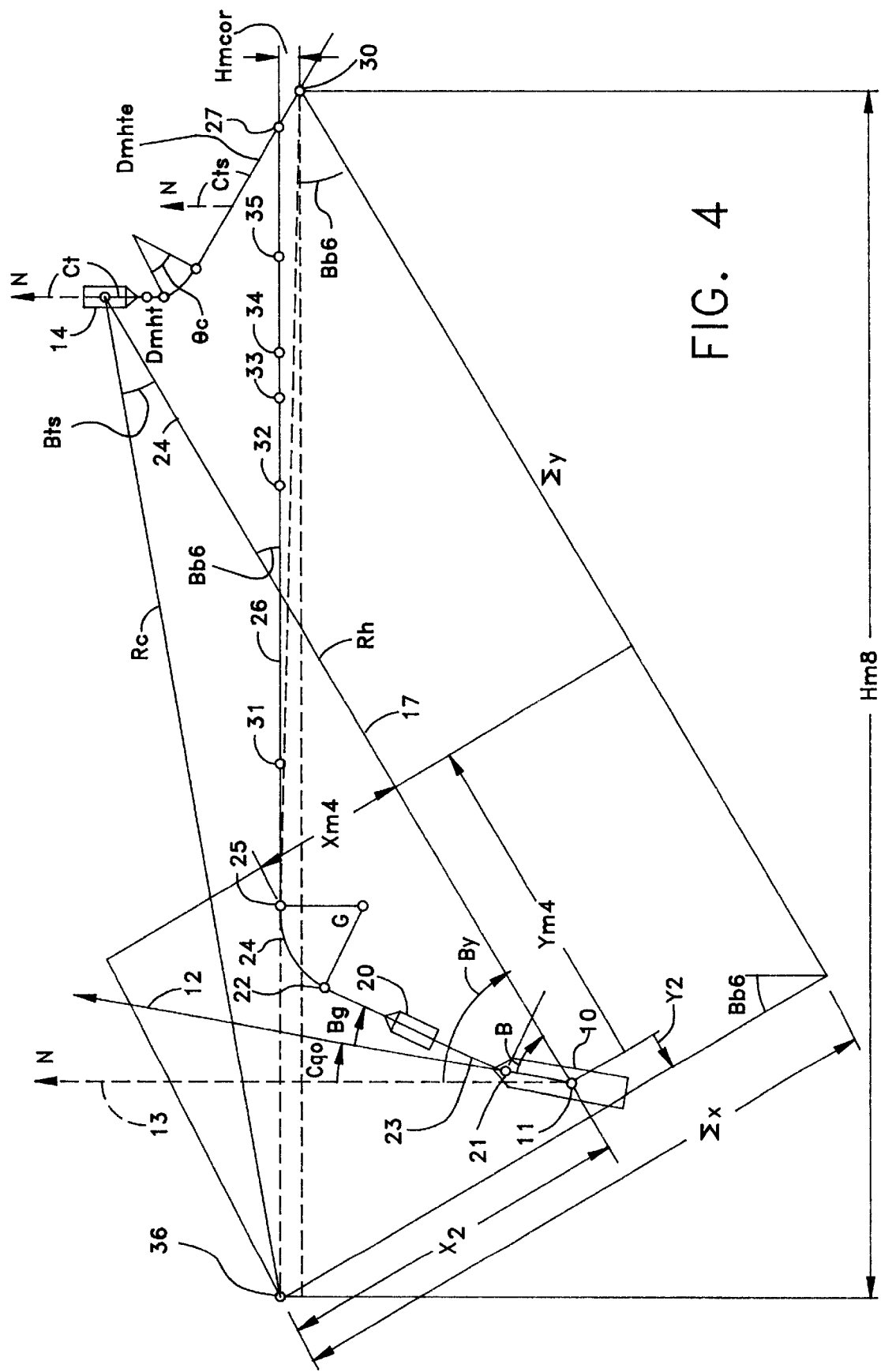
FIG. 4 depicts the modification of the relationship as shown in FIG. 2 that occur with the addition of the target vehicle evasion of FIG. 3.

FIG. 4 depicts FIG. 2 modified to include a target evasion as shown in FIG. 3. Referring to FIG. 4 and in accordance with this invention, the target vehicle 14 position taking into account the evasive maneuver as described in equations (20) and (21) is rotated from the map-based, or first, Cartesian coordinate system of FIG. 3 to the PLP, or second, Cartesian coordinate system. Looking at FIG. 4, the target position on the second Cartesian coordinate system at any location is given by coordinates:

$$TGT_{xPLP} = Dmht * Tr * \sin(Bts) \qquad (22)$$

and $$TGT_{yPLP} = Dmht * Tr * \cos(Bts). \qquad (23)$$

Substituting equation (10) into equations (22) and (23) yields:

$$\begin{bmatrix} TGT_{xPLP} \\ TGT_{yPLP} \end{bmatrix} = \begin{bmatrix} \cos(By) & -\sin(By) \\ -\sin(By) & -\cos(By) \end{bmatrix} * \begin{bmatrix} TGT_x \\ TGT_y \end{bmatrix}. \qquad (24)$$

If then equations (21), (21) and (24) are substituted in equations (8) and (9) for the terms (Dmht*Tr*sin*Bts) and (Dmht*Tr*sin*Bts) the evading target positions are defined with Tr being separated into three time increments, namely: (1) the time increment before evasion represented by Ta and Treac; (2) the time Tt during evasion turns; and (3) the time after evasion. These solutions convert equations (8) and (9) to:

$$\Sigma X = X2 + \cos(By) * TGT_x - \sin(By) * TGT_y \qquad (25)$$

and $$\Sigma Y = Rh - Y2 + \sin(By) * TGT_x + \cos(By) * TGT_y \qquad (26)$$

that then can be substituted directly into equations (12), (13) and (14) for solution.

In one particular control system for implementing the process described with respect to FIG. 2, the addition of the capability of incorporating target evasion into the solution requires only minor changes to one constant velocity position keeping algorithm that defines the target position as shown in FIGS. 1 and 2 with a process for keeping both a straight line path with speed change and position in a turn according to equations (19) and (20) and modifying another solution for defining the position of the pursuing vehicle according to equations (24) and (25). In one particular embodiment, the invention implemented after required modifying less than 1% of the programming code.

Figure 5:
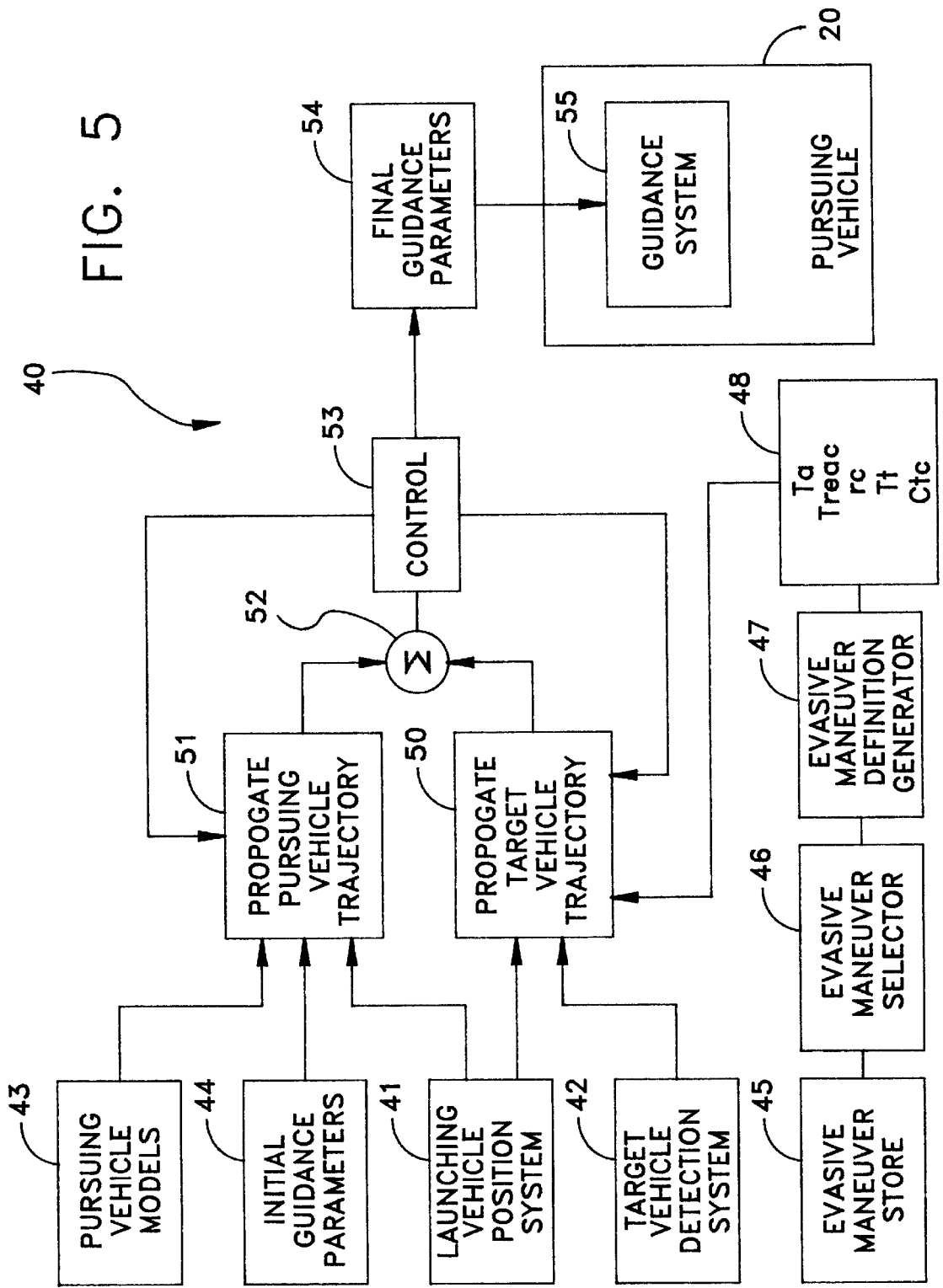
FIG. 5 is a schematic of apparatus for implementing this invention.

FIG. 5 depicts the organization of a control system 40 for implementing this invention. Although the control system could be implemented in a number of ways including the use of specially constructed hardware, a preferred embodiment would be implemented by a general or special purpose computer working in conjunction with various sensors and related equipment are known in the art. The control system 40 would include, for purposes of this invention, a launching vehicle position system 41 and a target vehicle detection system 42. The launching vehicle position system 41 would comprise sensors and related navigational instrumentation to provide signals from which the system 41 can determine the location of the launching vehicle 10 and its course and speed. Similarly the target vehicle detection system 42 generally would sense range and bearing. The remainder of the control system 40 would use this information together with information concerning the position of the vehicle to determine a course and speed of a target.

The control system 40 additionally includes a pursuing vehicle model unit 43 that would typically comprise stored data bases for each type of pursuing vehicle that might be launched from the launching vehicle 10. An initial guidance parameters unit 44 provides a means for producing initial guidance parameters such as the gyro angle, G, and the total run time, Tr, for starting the solution process. The initial guidance parameters unit 44 can be adapted for manual input for individual solutions or might even be constituted by a device for providing preset values such as zero.

An evasive maneuver store 45, that could comprise a memory for a number of evasive maneuver data structures for different types of target vehicles 14. These parameters would include turning radii, turning angles, speeds and other potential characteristics of an identified target vehicle. Typically the target vehicle detection system 42 would also have the facility of classifying a particular target to facilitate the selection of one of the data structures from the evasive maneuver store 45.

Selection would be made through an evasive maneuver selector 46 that could enable an entirely manual selection, or, although not shown, utilize information from the target vehicle detection system and other portions of the control system 40 to make a selection. In response to the selection and evasive maneuver definition generator 47 would produce the various parameters from which the trajectory is produced including the alertment time, Ta, the reaction time, Treac, the range from the pseudo launch point 36 to the detection position 15, Rc, the turn time, Tt, and the final course bearing, Cte. These would be loaded into a unit 48 for transfer to a propagate target vehicle trajectory unit 50.

The propagate target vehicle trajectory unit 50 or equivalent procedure utilizes information from the launch vehicle position system 41, the target vehicle detection system 42 and the unit 48 to propagate the target vehicle along a trajectory such as shown in FIG. 4 as determined by the evasive maneuver selection. This is generated as a time series to move the target position incrementally along the trajectory. Simultaneously and in phase with the operation of the propagate target vehicle trajectory unit 50 a propagate pursuing vehicle trajectory unit 51 defines the position of the pursuing vehicle. The unit 51 utilizes information from the launching vehicle position system 41, the pursuing vehicle models 43 and the initial guidance parameters unit 44 to determine the positions. When both the units 50 and 51 have propagated a trajectory to a final point, an error unit 52 compares the resulting parameters to the initial parameters. If the solution has not converged, a control 53 returns new values as initial values to the units 50 and 51 and the process repeats.

When the error unit 52 produces a result indicating a solution convergence, the control 53 utilizes the guidance parameters that have been developed, namely the gyro turn and run-to-enable times as inputs to a final guidance parameter unit 54 that connects to the pursuing vehicle guidance system 55 in the pursuing vehicle 20. When this process is complete, the pursuing vehicle 20 can be launched.

The efficiency of this system has been proven by simulating a number of possible, but typical, scenarios. For comparison each scenario, or run, assumes the following initial conditions:

Rh=7000 yds
By=0°
Dmht=10 knots
Ct=90°
Umn=high
Ums=medium

The results are given in the following table:

| RUN NUMBER | EVASION COURSE DEG | EVASION SPEED KNTS | GYRO ANGLE DEG | RUN TIME SEC | RUN DISTANCE YDS |
|---|---|---|---|---|---|
| 1 | 90 | 10 | 3.1 | 220.9 | 5145.9 |
| 2 | 90 | 25 | 17.1 | 238.9 | 6296.9 |
| 3 | 10 | 25 | 359.2 | 296.3 | 8053.4 |
| 4 | 45 | 25 | 8.3 | 296.7 | 8065.2 |
| 5 | 135 | 25 | 6.3 | 189.1 | 4774.8 |

The first run is based upon a non-evading target vehicle. Specifically, FIG. 6 depicts a non-evading target vehicle represented by a target vehicle vector 60A from the detection point 15 to the expected beginning of an evasive maneuver and a following vector 60B that depicts an evasive maneuver. In this embodiment the vector 60B is merely an extension of the vector 60A because no evasive maneuver occurs. A pursuing vehicle trajectory 61 from a launch point 11 is extended to a laminar point 62 for the run corresponding to the laminar point 35 in FIGS. 1, 2 and 4. The triangular area 63 represents the detection area of a homing device in the pursuing vehicle once the device is activated at the enable seeker point 34 in FIGS. 1, 2 and 4. Thus FIG. 5 depicts a positive intercept of a non-evading target at an intercept point 64.

FIG. 7 depicts the second run in which the evasion tactic is merely to increase speed. That is, a target vehicle course vector 70B after alertment has the same course as the pre-alertment course vector 70A, but it has a greater magnitude given the speed increase of 150%. Consequently the gyro turn angle is increased over that in the first run. Again, however, the pursuing vehicle course vector 71 leads to a laminar point 72 that produces a detection area 73 encompassing the target vehicle at an intercept point 74.

FIG. 8 depicts a scenario in which the target vehicle is travelling along an initial course 80A. At alertment the target vehicle turns to a course 80B that is essentially parallel to the trajectory of the pursuing vehicle represented by vector 81. It is also assumed that the evasion speed increases in this embodiment. The control system produces a different gyro angle and the pursuing vehicle travels along a different course vector 81 to a laminar position 82 at which the target vehicle is within the detection area 83 to produce an intercept point 84.

FIG. 9 assumes that the pre-alertment vector 90A will shift to a vector 90B that is rotated 45° to port to a course 71 and that the evasion speed will be 25 knots. The solution establishes a different gyro turn angle producing a pursuing vehicle trajectory 90 to a laminar point 92. Again the detection area 93 encompasses the target vehicle at an intercept point 94.

FIG. 10 depicts an alternative evasive maneuver in which the target vehicle turns from an original trajectory 100A to starboard by 45° to a course or trajectory 100B that also represents an increase in speed. This produces again a different gyro angle and establishes a pursuing vehicle trajectory 101 to a laminar point 102. The resulting detection area 103 again overlies the target vehicle at an intercept point 104.

These runs represent a wide variety of evasive maneuvers and demonstrate that the invention produces appropriate solutions in each run. The invention can be implemented with only minor variations in existing programs and consequently incorporates the ability to incorporate evasive target vehicle trajectories without any significant increase in the processing time. In essence the capability of incorporating target evasion can be considered without any cost. As previously indicated it is expected that in a preferred embodiment will incorporate existing sensors and systems for establishing launching vehicle and target vehicle positions and initial conditions. Moreover it is expected that a program general purpose computer or special purpose computer will perform most of the functions required to obtain the initial guidance parameters for transfer to the pursuing vehicle prior to launch. However, any number of alternatives utilizing specially constructed hardware or multiple computers for performing particular modular functions could be substituted. Such substitutions are well within the capabilities of persons of ordinary skill in the art.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed is:

1. In a system for directing a pursuing vehicle from a launching vehicle to a target vehicle wherein the launching vehicle determines a range and bearing to and course and speed of the target vehicle and generates initial operating parameters for transfer to the pursuing vehicle that establish an intercept trajectory including a path along an aim point bearing to the target vehicle from the launching vehicle and wherein the determination of the initial operating parameters is made with respect to a first Cartesian coordinate system having an ordinate axis on the determined bearing, the improvement for enabling the operating parameters to compensate for a post launch evasive maneuver of the target vehicle comprising the steps of:

defining the trajectory of the target vehicle including the evasive maneuver on a second Cartesian coordinate system;

converting the definition of the target vehicle course from the second to the first Cartesian coordinate system by rotating the second Cartesian coordinate system by an angle equal to the difference between the aim point path bearing and the determined bearing to the target; and iteratively processing the courses of the pursuing and target vehicles to the intercept in advance of the launch to generate the initial operating parameters.

2. A method as recited in claim 1 wherein the definition of the target vehicle trajectory includes the steps of:

defining for the target vehicle a starting time at which the target vehicle will begin its evasive maneuver; and defining an evasive maneuver ending time at which the target vehicle terminate its evasive maneuver.

3. A method as recited in claim 2 wherein the target vehicle can detect the presence of the pursuing vehicle at some distance therefrom and undergo any of a plurality of evasive maneuvers and wherein the definition of evasive maneuver starting time includes the steps of defining an alertment time that will expire from the launch to the detection of the pursuing vehicle by the target vehicle and a reaction time during which the detection of the pursuing vehicle is made and the selection of an evasive maneuver occurs.

4. A method as recited in claim 2 wherein said step of defining the target vehicle evasive maneuver includes the definition of a turning movement.

5. A method as recited in claim 4 wherein said step of defining the target vehicle evasive maneuver includes the definition of a change in target vehicle speed.

6. A method as recited in claim 2 wherein said step of defining the target vehicle evasive maneuver includes the definition of a change in target vehicle speed.

7. A method as recited in claim 2 wherein the second Cartesian coordinate system has its ordinate on a true North-South axis and the conversion of the target vehicle trajectory includes rotating the target vehicle trajectory from the second Cartesian coordinate system by an angle corresponding to the angle between the ordinates of the first and second Cartesian coordinate systems.

8. A method as recited in claim 7 wherein the instantaneous position of the target vehicle along the target vehicle trajectory is given by a $TGT_{x\,PLP}$ value and a $TGT_{y\,PLP}$ value representing the distances from a reference point to the target vehicle along the abscissa and ordinate, respectively, of the first Cartesian coordinate system.

9. A method as recited in claim 8 wherein the $TGT_{x\,PLP}$ value and the $TGT_{y\,PLP}$ value are given by:

$$TGT_{xPLP} = Dmht * Tr * \sin(Bts)$$

and $$TGT_{yPLP} = Dmht * Tr * \cos(Bts)$$

wherein Dmht is the speed of the target vehicle, Tr is the total run time for the pursuing vehicle and Bts is a target vehicle aspect angle.

10. A method as recited in claim 9 wherein the relationship between the first and second Cartesian coordinate systems is given by:

$$\begin{bmatrix} TGT_{xPLP} \\ TGT_{yPLP} \end{bmatrix} = \begin{bmatrix} \cos(By) & -\sin(By) \\ -\sin(By) & -\cos(By) \end{bmatrix} * \begin{bmatrix} TGT_x \\ TGT_y \end{bmatrix} 1$$

wherein By is the bearing from the launching vehicle to the target vehicle at the time of the launch.

11. A method as recited in claim 10 wherein said iterative processing of the courses determines and intercept point is given by:

$$\Sigma X = X2 + \cos(By) * TGT_x - \sin(By) * TGT_y$$

and $$\Sigma Y = Rh - Y2 + \sin(By) * TGT_x + \cos(By) * TGT_y$$

wherein Rh is the range from the launching vehicle to the target vehicle at the time of launch.

12. A system for directing a pursuing vehicle from a launching vehicle to a target vehicle wherein the launching vehicle determines a range and bearing to and course and speed of the target vehicle and generates initial operating parameters for transfer to the pursuing vehicle that establish an intercept trajectory including a path along an aim point bearing to the target vehicle from the launching vehicle and wherein the determination of the initial operating parameters is made with respect to a first Cartesian coordinate system having an ordinate axis on the determined bearing, the improvement for enabling the operating parameters to compensate for a post launch evasive maneuver of the target vehicle comprising the steps of:

first means for defining the trajectory of the target vehicle including the evasive maneuver on a second Cartesian coordinate system;

second means for converting the definition of the target vehicle course from the second to the first Cartesian coordinate system by rotating the second Cartesian coordinate system by an angle equal to the difference between the aim point bath bearing and the determined bearing to the target; and third means for iteratively processing the courses of the pursuing and target vehicles to the intercept in advance of the launch to generate the initial operating parameters.

13. A system as recited in claim 12 wherein said first means includes:

means for defining for the target vehicle a starting time at which the target vehicle will begin its evasive maneuver; and means for defining an evasive maneuver ending time at which the target vehicle terminate its evasive maneuver.

14. A system as recited in claim 13 wherein the target vehicle can detect the presence of the pursuing vehicle at some distance therefrom and undergo any of a plurality of evasive maneuvers and wherein said evasive maneuver starting time definition means defines an alertment time that will expire from the launch to the detection of the pursuing vehicle by the target vehicle and a reaction time during which during which the detection of the pursuing vehicle is made and the selection of an evasive maneuver occurs.

15. A system as recited in claim 13 wherein said first means includes means for defining a turning movement.

16. A system as recited in claim 15 wherein said first means includes means for defining a change in target vehicle speed.

17. A system as recited in claim 13 wherein said first means includes means for defining a change in target vehicle speed.

18. A system as recited in claim 13 wherein the second Cartesian coordinate system has its ordinate on a True North-South axis and said converting means includes means for rotating the target vehicle trajectory from the second Cartesian coordinate system by an angle corresponding to the angle between the ordinates of the first and second Cartesian coordinate systems.

19. A system as recited in claim 18 wherein the instantaneous position of the target vehicle along the target vehicle trajectory produced by the rotation is given by a $TGT_{x\_PLP}$ value and a $TGT_{y\_PLP}$ value representing the distances from a reference point to the target vehicle along the abscissa and ordinate, respectively, of the first Cartesian coordinate system.

20. A system as recited in claim 19 wherein the $TGT_{x\_PLP}$ value and the $TGT_{y\_PLP}$ value are given by:

$$TGT_{xPLP} = Dmht * Tr * \sin(Bts)$$

and $$TGT_{yPLP} = Dmht * Tr * \cos(Bts)$$

wherein Dmht is the speed of the target vehicle, Tr is the total run time for the pursuing vehicle and Bts is a target vehicle aspect angle.

21. A system as recited in claim 20 wherein the relationship between the first and second Cartesian coordinate systems is given by:

$$\begin{bmatrix} TGT_{xPLP} \\ TGT_{yPLP} \end{bmatrix} = \begin{bmatrix} \cos(By) & -\sin(By) \\ -\sin(By) & -\cos(By) \end{bmatrix} * \begin{bmatrix} TGT_x \\ TGT_y \end{bmatrix} 2$$

wherein By is the bearing from the launching vehicle to the target vehicle at the time of the launch.

22. A system as recited in claim 21 wherein said iterative processing of the courses determines and intercept point is given by:

$$\Sigma X = X2 + \cos(By) * TGT_x - \sin(By) * TGT_y$$

and $$\Sigma Y = Rh - Y2 + \sin(By) * TGT_x + \cos(By) * TGT_y$$

wherein Rh is the range from the launching vehicle to the target vehicle at the time of launch.

* * * * *